Patented Mar. 17, 1925.

1,530,016

UNITED STATES PATENT OFFICE.

SHINJI SHIMIZU, OF OGASA-GUN, JAPAN, ASSIGNOR TO NIHON CHASEI KABUSHIKI KWAISHA, OF UJI-CHO, KUSE-GUN, KYOTO-FU, JAPAN.

PROCESS OF MANUFACTURING TEA ESSENCE.

No Drawing.     Application filed April 2, 1920.   Serial No. 370,871.

*To all whom it may concern:*

Be it known that I, SHINJI SHIMIZU, a subject of the Empire of Japan, residing at 452, Yokosuka-Machi, Ogasa-Gun, Shizuoka-Ken, Japan, have invented a certain new and useful Improvement in the Process of Manufacturing Tea Essence, of which the following is a specification.

My invention relates to a process of manufacturing tea-essence. The invention consists in condensing the juice, directly extracted from tea-leaves, first in a vacuum evaporator into a partial viscosity, then kneading or agitating it in an open pan at a temperature just below the scorching point by carefully controlled heat supplied from beneath, and finally drying it into powder in a vacuum pan; and has for its object to manufacture a tea-essence, pleasant in taste and flavor, easy to dissolve into water, compact to facilitate storage, easy to use, free from disagreeable odor and excessive viscosity (which usually characterizes the products from similar attempts) by an economical method.

An example of the practice of this invention is as follows: a mass of tea-leaves, fresh or dried and stored, is heated by steam, and next subjected to pressure to squeeze out the juice, which is poured into a vacuum evaporator to gradually boil out the water portion while maintaining the temperature of the juice at about 50 degrees C. When a proper density, for instance 25 to 30 degrees Baumé, is obtained, the juice in the vacuum evaporator is poured into an open pan, and subjected to a vigorous and constant agitation or kneading for about 30 minutes, while maintained at a temperature just below the scorching point, for instance 80 degrees C., by a carefully controlled heat supplied from beneath. It is then placed in a vacuum evaporator, preferably provided with an agitator, again, and further condensed while maintained at a temperature not exceeding 60 degrees C., until it is dried into powder.

Hitherto, several attempts have been made to make tea-essences directly from the tea-leaves, but as nearly all of them aimed at condensing the squeezed juice by mere evaporation, the extracts were apt in most cases to become over-viscous, would not easily dry into powder and the product would not readily dissolve in water for use, besides being deprived of the peculiar taste and flavor of tea, and especially several disagreeable odors were generally present, which made them wholly impractical in use. In the present invention, however, the extracted juice is condensed first in a vacuum evaporator, then poured out into an open pan and subjected to the kneading or agitating treatment for a length of time, while being heated from beneath up to a degree of temperature just below the scorching point, and finally dried into powder again in a vacuum evaporator. Thus the extract can develop out its proper taste and flavor in their full degree, in the same way as ordinary tea does in the twisting and crumpling process, enabling the extract to compete favorably with ordinary tea, or in other words, the kneading process in the present invention, not only by its physical effect, but by the peculiar chemical action of heat and air, appears to lead to the useful change in the ingredients of tea. Tea-essence, manufactured according to the present invention, therefore, is free from disagreeable odor and excessive viscosity, in a completely manufactured state, is highly soluble in hot or cool water, and can be easily used as a substitute for tea in a very simple manner. It can be used in several drinks or foods like ice-cream, etc. to give them flavor and taste, and being less voluminous has a great advantage in transportation and storage over ordinary tea.

I claim:—

The method of manufacturing tea essence, consisting in extracting juice from tea-leaves, preliminarily condensing said juice while in a vacuum chamber, placing the condensed juice alone in an open pan and heating the same to increase its viscosity and subjecting the pure juice to a kneading action while maintaining it at a temperature just below the scorching point, and finally drying it into a powder in a vacuum chamber.

In testimony whereof I have affixed my signature in presence of two witnesses.

SHINJI SHIMIZU.

Witnesses:
EISHIRO ABE,
KWAN JOPIKAWA.